(12) United States Patent
Chambers, Sr.

(10) Patent No.: US 6,237,275 B1
(45) Date of Patent: *May 29, 2001

(54) ARTIFICIAL BAIT STRUCTURE (75) Inventor: William E. Chambers, Sr., Watkinsville, GA (US)

(73) Assignee: Zoom Bait Company, Inc., Bogart, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/794,332

(22) Filed: Feb. 3, 1997

(51) Int. Cl.⁷ ................................................ A01K 85/00
(52) U.S. Cl. .................................... 43/42.29; 43/42.3
(58) Field of Search .................... 43/42.28, 42.29, 43/42.3, 42.38, 42.37, 42.24

(56) References Cited

U.S. PATENT DOCUMENTS

| D. 131,135 | * | 1/1942 | Adam | 43/42.29 |
|---|---|---|---|---|
| 1,178,861 | | 4/1916 | Kruschke | |
| 1,535,957 | * | 4/1925 | Stanley et al. | 43/42.29 |
| 1,709,010 | * | 4/1929 | Foss | 43/42.3 |
| 1,986,991 | * | 1/1935 | Wilson | 43/42.3 |
| 2,636,316 | * | 4/1953 | Solovioff | 43/42 |
| 3,122,853 | * | 3/1964 | Koonz | 43/42.24 |
| 5,009,024 | * | 4/1991 | Parman | 43/42.3 |
| 5,065,541 | * | 11/1991 | Coody | 43/42.29 |
| 5,524,377 | * | 6/1996 | Freeman | 43/42.3 |

FOREIGN PATENT DOCUMENTS

2327727 * 5/1977 (FR) .................................... 43/42.3

* cited by examiner

Primary Examiner—Kurt Rowan
(74) Attorney, Agent, or Firm—Andrus, Sceales, Starke & Sawall, LLP

(57) ABSTRACT

An artificial bait structure is provided which simulates movement of live bait when drawn through a body of water, and which discourages entanglement in weeds at the bottom of a lake or river. The artificial bait structure includes a head having first and second legs projecting therefrom. The legs include a plurality of nipples which are engaged by the water as the artificial bait structure is drawn therethrough, causing the legs to flutter. A rib extends along the outer edge of each leg in order to cup the water as the artificial bait structure is drawn therethrough, thereby causing the legs to repeatedly separate and come together.

29 Claims, 2 Drawing Sheets

ARTIFICIAL BAIT STRUCTURE

BACKGROUND AND SUMMARY OF THE INVENTION

This invention relates to a fishing lure, and more particularly to a fishing lure which acts to simulate live bait movement.

Common jig-type fishing lures include a fish hook having a mass of material, usually metal, formed around the end of the hook opposite the barb to create a jighead. An attachment eye is attached to and extends outwardly from the jighead to provide a point of connection to a fishing line. The jighead is often painted a bright color to attract the attention of a fish.

Typically, a fisherman attaches bait such as minnow, pork rind, or a plastic rubber worm, to the hook. When a conventional fishing jig, as described, is cast out and reeled in, the configuration of the jighead creates several drawbacks. First, since jigheads are typically uniform in shape and somewhat streamlined, the fishing jig tends to travel through the water in a straight path, drawing the bait similarly through the water in a straight path. Such straight line movement of the bait through the water does not typically attract fish.

In order to alleviate this problem, a live minnow is often attached to the fishing jig, such that the swimming movement of the minnow will attract fish. However, after being cast out and reeled in repeatedly, the minnow tires and tends to be drawn through the water in a straight path, defeating the original purpose for using the live bait. Further, the constant replacement of the minnow on the fishing jig can be troublesome and expensive.

As an alternative to the use of a live minnow, many attempts have been made to provide fishing jigs and/or artificial bait which simulate live bait movement. The most common attempt includes a mechanism, such as a fin, which causes the lure to wobble when the lure is pulled through the water by a fishing line. However, these types of lures are generally large in size and costly to manufacture.

A second drawback of using a fishing jig relates to the weight of a conventional fishing jig. Jigheads are typically made of metal, and hence normally sink and travel near the bottom of the lake or river where the exposed hook can be easily entangled in the weeds. It is well known in the fishing industry to render a hook weedless by providing a series of reedlike deflectors that originate from the shank of the hook and extend to a point near the barb of the hook. To be effective, the weed deflector must be stiff enough to deflect the weed so that it will not contact and become entangled in the hook, while not being too stiff to interfere with the setting of the hook in the mouth of the fish. As with fishing lures which have attempted to simulate live bait movement, these modifications to the hook may be difficult and costly to manufacture.

Therefore, it is a primary object and feature of the present invention to provide an artificial bait structure for use with a conventional fishing jig which is simple and inexpensive to manufacture.

It is a further object and feature of the present invention to provide an artificial bait structure which simulates live bait movement and which discourages the entanglement of the fishing hook in weeds.

In accordance with the present invention, an artificial bait structure includes a head having a first forward end and a second rearward end. First and second generally flat fins or legs project rearwardly from the rearward end of the head along a longitudinal axis. Each leg is defined by a first inner edge and a second outer edge, and terminates at a rearward end. A projection extends rearwardly from the rearward end of each leg.

A rib extends along the outer edge of each leg between the head and the rearward end of the corresponding leg. In addition, protrusions or nipples project from the topside of the head and both sides of the each leg. The ribs and the nipples add surface area to the artificial bait structure, which, in turn, causes the legs to flutter so as to simulate the movement of live bait. Further, the generally flat surface area of the legs urges the artificial bait structure, and hence the fishing jig, upwardly when the artificial bait structure is drawn through the water keeping the fishing jig and the artificial bait out of weeds on the bottom of a lake or a river.

BRIEF DESCRIPTION OF THE DRAWINGS

The drawings furnished herewith illustrate the best mode of the present invention in which the above advantages and features are clearly understood from the following description of the illustrated embodiment.

In the drawings.

DETAILED DESCRIPTION OF THE PREFERRED EMBODIMENT

Referring to FIGS. 1–6, the artificial bait structure of the present invention is generally designated by the reference numeral 10. The artificial bait structure 10 extends along a longitudinal front-rear axis and includes a head 12 having a first forward end 14 and a second rearward end 16. Head 12 further includes a generally planar lower surface 18 and a generally planar upper surface 20, which is integral and continuous with upper surfaces 22 and 24 defined by legs 26 and 28, respectively, as hereinafter described. Head 12 is defined by a U-shaped outer edge 30 which includes a first upper portion 32 perpendicular to the upper surface 20 of head 12, and a tapered or chamfered lower portion 34 which facilitates the removal of artificial bait structure 10 from a mold, as is known.

As previously described, artificial bait structure 10 includes first and second generally flat fins or legs 26, 28, respectively, projecting rearwardly from the rearward end 16 of head 12. Legs 26 and 28 define arcuate, convex outer edges 36 and 38, respectively, which extend between the rearward end 16 of head 12, and rearward ends 40, 42 defined by legs 26 and 28, respectively. Flexible projections 35 and 37 extend from rearward ends 40 and 42, respectively, and are offset in an inward direction from the longitudinal axis of legs 26 and 28, respectively. Artificial bait structure 10 further includes a joined portion 48 located immediately rearwardly of head 12 wherein a forward portion of legs 26 and 28 are joined to each other.

Legs 26 and 28 define inner edges 44 and 46, respectively, which extend from the joined portion 48 of the artificial bait structure 10, to the corresponding rearward end 40 and 42 of legs 26 and 28, respectively. Inner edges 44 and 46 include a first rearward linear portion 50 and 52, respectively, and a second forward concave portion 54 and 56, respectively, which curves outwardly toward corresponding outer edges 36 and 38 of legs 26 and 28, respectively. Concave portions 54 and 56 together define a generally elliptical opening in bait structure 10, and linear portions 50 and 52 define a rearwardly divergent gap between legs 26 and 28 extending between the elliptical opening and the rearward end of bait structure 10.

Upper surfaces 22 and 24 of legs 26 and 28, respectively, and the upper surface 20 of head 12, include a plurality of upwardly extending projections or nipples 58 which are arranged in parallel, spaced rows 60a–n. Rows 60a–n extend in a direction transverse to the longitudinal axis of artificial bait structure 10. In the preferred embodiment, each nipple 58 is generally cylindrical in shape. However, it is contemplated as being within the scope of the present invention to provide nipples 58 with any other satisfactory shape, such as a semi-spherical shape. Nipples 58 are provided in order to increase the surface area of the upper surface 20 of head 12 and the surface area of the upper surfaces 22 and 24 of legs 26 and 28, respectively, for reasons hereinafter described.

Legs 26 and 28 further include second, generally planar, bottom surfaces 62 and 64, respectively. Bottom surfaces 62 and 64 of legs 26 and 28, respectively, also includes a plurality of downwardly extending projections or nipples 66 arranged in parallel, spaced rows 68a–h. Rows 68a–h extend in a direction transverse to the longitudinal axis of artificial bait structure 10. In the preferred embodiment, each nipple 66 is generally cylindrical in shape. However, it is contemplated as being within the scope of the present invention to provide nipples 66 with any other satisfactory shape, such as a semi-spherical shape. As with nipples 58, nipples 66 are provided on bottom surfaces 62 and 64 of legs 26 and 28, respectively, in order to increase the surface area of the bottom surfaces 62 and 64, for reasons hereinafter described.

Bottom surfaces 62 and 64 of legs 26 and 28, respectively, include outer ribs 70 and 72, respectively, which depend downwardly from the outer edges 36 and 38 of legs 26 and 28, respectively, and which extend between head 12 and rearward ends 40 and 42 of legs 26 and 28, respectively. Each rib 70 and 72 provides a certain amount of stiffness to the outer edge of its respective leg relative to the thin inner portion of the leg, and also increases the surface area to the bottom surfaces 62 and 64 of legs 26 and 28, respectively. Ribs 70 and 72 also function to direct water toward the bottom surfaces 62 and 64 of legs 26 and 28, respectively, as artificial bait structure 10 is drawn through the water. By directing water toward the bottom surfaces 62 and 64 of legs 26 and 28, respectively, artificial bait structure 10 is urged upwardly in the water.

Referring to FIGS. 2, 4 and 7–8, the joined portion 48 of artificial bait structure 10, is generally planar and is interconnected to head 12 by a thickened portion 76 which strengthens the connection of legs 26 and 28 to head 12. Thickened portion 76 also directs water toward the bottom surfaces 62 and 64 of legs 26 and 28, respectively, as artificial bait structure 10 is drawn through the water so as to urge the artificial bait structure 10 upwardly in the water.

Figure 1:
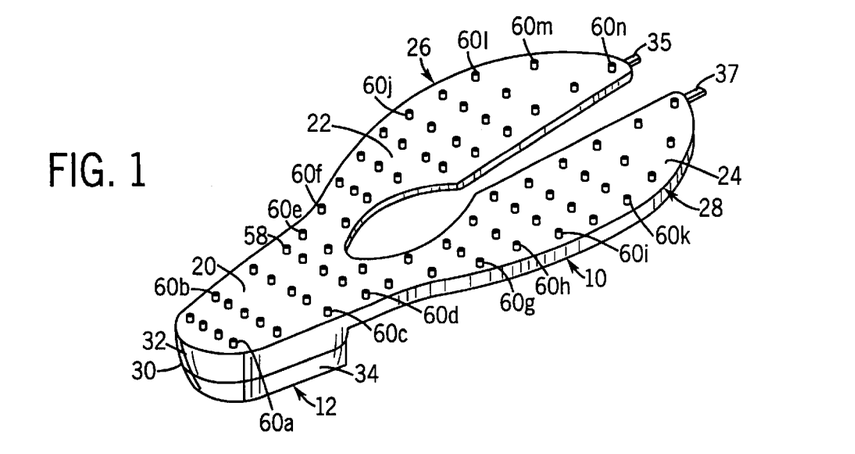
FIG. 1 is an isometric view of the artificial bait structure of the present invention.
Figures 2, 3:
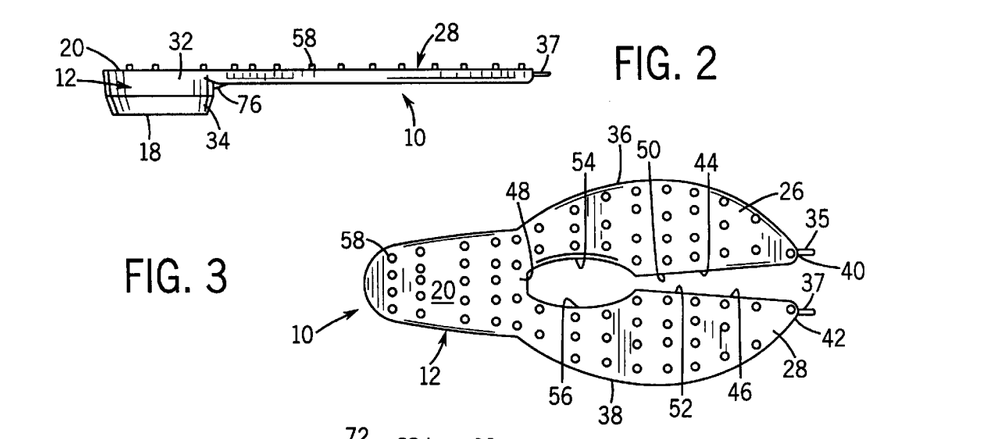
FIG. 2 is a side elevational view of the artificial bait structure of FIG. 1.
FIG. 3 is a top plan view of the artificial bait structure of FIG. 1.
Figure 4:
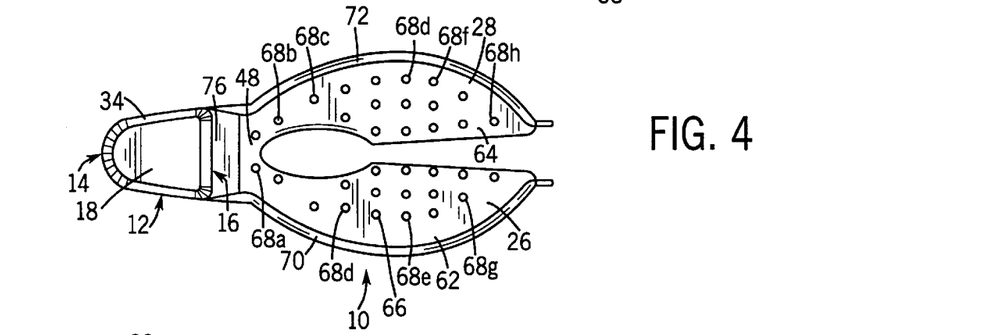
FIG. 4 is a bottom plan view of the artificial bait structure of FIG. 1.
Figure 5:
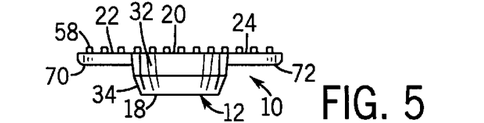
FIG. 5 is a front elevational view of the artificial bait structure of FIG. 1.
Figure 6:
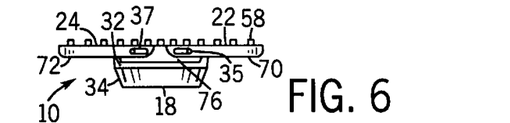
FIG. 6 is a rear elevational view of the artificial bait structure of FIG. 1.
Figure 7:
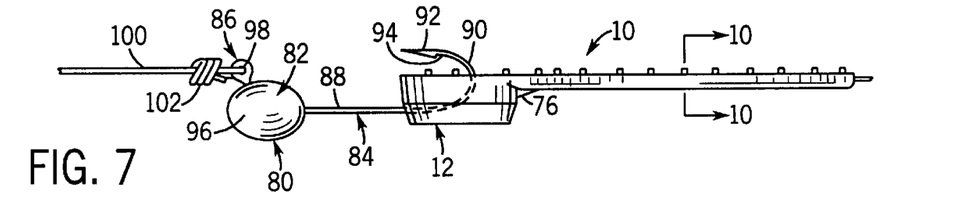
FIG. 7 is a side elevational view of the artificial bait structure of FIG. 1 mounted onto a fishing jig.
Figures 8, 9:
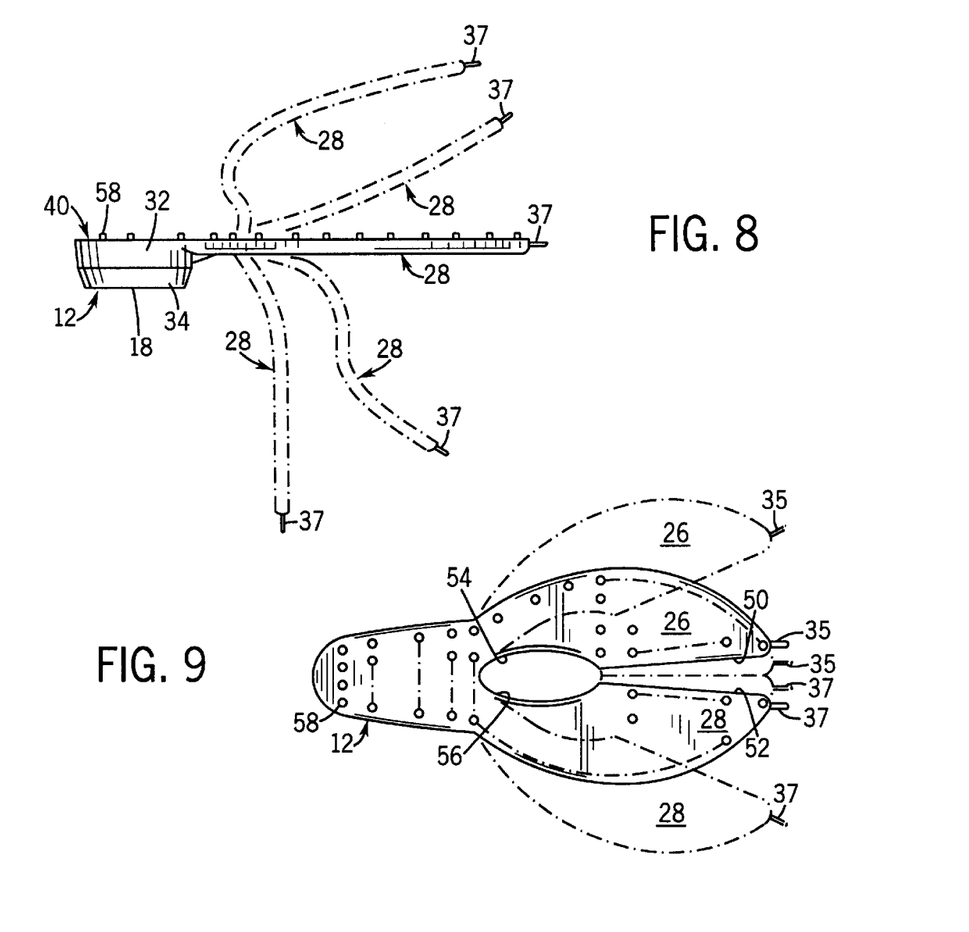
FIG. 8 is a side elevational view showing the artificial bait structure of FIG. 1 in a plurality of positions, in phantom, simulating live bait movement.
FIG. 9 is a bottom plan view showing the artificial bait structure of FIG. 1 in a plurality of positions, in phantom, simulating live bait movement.
Figure 10:
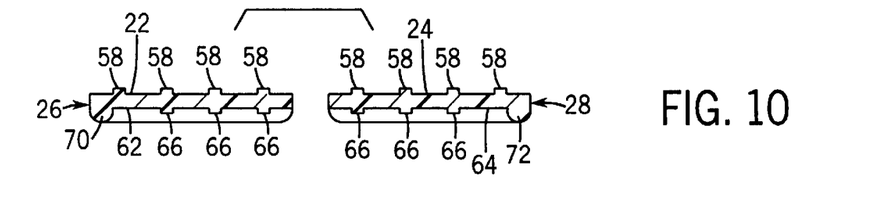
FIG. 10 is a cross-sectional view of the artificial bait structure of FIG. 7 taken along line 10—10.

Referring to FIG. 7, a fishing jig for use with the present invention is generally designated by the reference numeral 80. As illustrated, fishing jig 80 is generally comprised of a molded head 82, a hook member 84, and an attachment eye 86. Hook member 84 includes a generally straight shank 88 which projects rearwardly along an axis from the tail end of molded head 82. Shank 88 extends rearwardly until it is bent upward to create a curved section 90. Curved section 90 forms a generally semi-cylindrical configuration and is joined to a tail section 92 that extends forward and generally parallel to shank 88. In a preferred embodiment, the tail section 92 terminates at a barb 94. As is known, barb 94 is placed on tail section 92 to securely hold hook 84 in the mouth of the fish and prevent removal therefrom.

Molded head 82 includes a body 96 which is generally spherical in shape. As seen in FIG. 7, shank 88 of hook member 84 is joined to spherical body 96 at approximately the spherical equator of body 96. Also joined to the spherical body 96 is attachment eye 86. The attachment eye 86 defines an opening 98 therethrough in which a fishing line 100 is attached.

Attachment eye 86 is generally positioned along an axis passing through the center of spherical body 96. The attachment eye 86 can be attached to spherical body 96 by any conventional means such as welding, or preferably, the attachment eye 86 can be formed at the end of shank 88, which may extend through molded head 82. As such, a portion of shank 88 containing attachment eye 86 protrudes from molded head 82 such that attachment eye 86 is securely mounted to spherical body 96, as is shown.

In operation, fishing line 100 extends through opening 98 in attachment eye 86 and a knot 102 is formed in fishing line 100 so as to interconnect fishing line 100 with fishing jig 80. Tail section 92 of hook member 84 is inserted through the head 12 of artificial bait structure 10 such that head 12 is captured on hook member 84, as shown in FIG. 7. Head 12 is partially received on shank 88 and on curved section 90 such that barb 94 of hook member 84 is spaced from the upper surface 20 of head 12, so as not to interfere with the setting of hook member 84 in the mouth of a fish.

As is conventional, a fisherman casts fishing line 100 and hence fishing jig 80 and artificial bait structure 10 attached thereto, into the water and allows fishing jig 80 and artificial bait structure 10 to partially sink toward the bottom of the lake or river. Once fishing jig 80 and artificial bait structure 10 has reached a predetermined depth, the fisherman begins to reel in the fishing line 100. As the fisherman begins to reel in the fishing line 100, tension is placed on the fishing line 100 and causes fishing jig 80 and artificial bait structure 10 to assume their operative position of FIG. 7.

As fishing line 100 is reeled in by the fisherman, the fishing jig 80 and the artificial bait structure 10 travel forwardly through the water. As water strikes upper and lower portions 32 and 34, respectively of head outer edge 30, together with upper surface 20 and lower surface 18 of head 12, turbulence is created in the water. The agitated water strikes upper surfaces 22 and 24 of legs 26 and 28, respectively, and bottom surfaces 62 and 64 of legs 26 and 28, respectively, such that the legs 26 and 28 begin to flap or flutter upwardly and downwardly in the water, as shown in phantom in FIG. 8. As the water flows horizontally across upper surfaces 22 and 24 of legs 26 and 28, respectively, and bottom surfaces 62 and 64 of legs 26 and 28, respectively, the water engages nipples 58 on leg upper surfaces 22 and 24 and engages nipples 66 projecting from leg bottom surfaces 62 and 64. Such contact of the water with nipples 58 and 66 functions to increase and enhance turbulence of the water, thus facilitating and enhancing the fluttering effect. In addition, the agitated water strikes flexible projections 35 and 37 extending from rearward ends 40 and 42, respectively, of legs 26 and 28, respectively. Such contact of the water with flexible projections 35 and 37 also further facilitates the fluttering effect and causes twisting action of legs 26 and 28 relative to their respective longitudinal axes.

In addition, as the artificial bait structure 10 is drawn through the water, ribs 70 and 72 extending adjacent to the outer edges 36 and 38 of legs 26 and 28, respectively, and thickened portion 76 of artificial bait structure 10, function to cup the water flowing therepast, so as to urge the water into the gap between the linear inner edge portions 50 and 52 of legs 26 and 28, respectively. By urging the water between the linear inner edge portions 50 and 52 of legs 26 and 28, respectively, the water separates legs 26 and 28, as shown in phantom in FIG. 9.

With legs 26 and 28 separated, the cupping effect caused by ribs 70 and 72 of legs 26 and 28, respectively, and thickened portion 76, dissipates. Consequently, the water engages outer edges 36 and 38, and ribs 70 and 72 of legs 26 and 28, respectively, thereby urging legs 26 and 28 back together, such that the inner edge linear portion 50 and 52 of legs 26 and 28, respectively, are moved into abutment, as shown in phantom in FIG. 9. The process is repeated as the artificial bait structure is drawn through the water. By combining the upward-downward fluttering movement of the legs 26 and 28 with continual lateral movement of legs 26 and 28 apart and together, artificial bait structure 10 simulates the movement of live bait and functions to effectively attract fish and agitate the fish into striking bait structure 10.

In addition to causing the continual lateral movement of legs 26 and 28, the cupping effect causes an increased amount of water to strike the bottom surfaces 62 and 64 of legs 26 and 28, respectively, in an upward direction. Due to the substantial surface area of bottom surfaces 62 and 64 of each leg 26 and 28, respectively, the water flowing past these surfaces 62 and 64 urges artificial bait structure 10 upward in the water. Such upward movement of the artificial bait structure 10 in the water discourages travel of fishing jig 10 near the bottom of the lake or river wherein hook 84 may become entangled in the weeds.

Various modes of carrying out the invention are contemplated as being in the scope of the following claims, particularly pointing out and distinctly claiming the subject matter regarded as the invention.

I claim:

1. An artificial bait structure, comprising:

a head having a forward end and a rearward end; and first and second legs extending rearwardly from the rearward end of the head, wherein each leg defines an inner edge and an outer edge and terminates at a rearward end, wherein each leg includes a rib extending along the outer edge of the leg between the head and the rearward end of the leg, wherein the rib has a thickness greater than that of the leg inwardly of the rib.

2. An artificial bait structure, comprising:

a head having a forward end and a rearward end; and first and second legs extending rearwardly from the rearward end of the head, wherein each leg defines an inner edge and a convex outer edge and terminates at a rearward end, and wherein the inner edge of each leg includes a generally linear portion which intersects with the convex outer edge to define the rearward end of the leg, wherein the generally linear portions of the legs face each other, and wherein the inner edge of each leg further includes an outwardly curved concave arcuate portion adjacent the rearward end of the head extending toward the outer edge of the leg forwardly of the linear portion, wherein the outwardly curved concave arcuate portions of the leg inner edges cooperate to define a void area having a concave configuration between the legs rearwardly of the head, wherein each leg defines a first width adjacent the head and a second width greater than the first width at a location rearwardly of the void area.

3. An artificial bait structure, comprising:

a head having a forward end and a rearward end; and first and second legs extending rearwardly from the rearward end of the head, wherein each leg defines an inner edge and an outer edge and terminates at a rearward end, and wherein the outer edge of each leg has a generally convex shape defining a substantially continuous arc between the rearward end of the leg and a location spaced forwardly therefrom, and wherein each leg defines a first width adjacent the head and a second width greater than the first width at a location spaced rearwardly therefrom, and wherein the inner edges of the legs are configured to define a void area defining an open rearward portion forming a gap between the legs and defining a closed forward end having a concave configuration located rearwardly of the head, wherein the inner edges of the legs define facing rearward sections which extend in a forward-rearward direction located rearwardly of the void area, and wherein the rearward section of the inner edge of each leg intersects the outer edge to define the rearward end of each leg.

4. An artificial bait structure, comprising:

a head defining a forward end of the artificial bait structure and having a thickness; and a pair of legs extending rearwardly from the head, wherein the legs are configured such that each leg defines a convex outer edge located laterally outwardly relative to the head and such that the legs define facing inner edges, wherein the legs have a thickness less than that of the head, and wherein each leg includes a forward portion which defines a first width adjacent the head and a rearward portion which defines a second width greater than the first width, and wherein the forward portions of the legs define mirror image concave inner edges which diverge outwardly away from each other rearwardly of the head and which converge toward each other forwardly of the leg rearward portions, wherein the concave inner edges cooperate to define an opening between the legs having a concave forward end and an open rearward end, wherein the rearward portions of the legs define facing inner edge sections located rearwardly of the opening which extend in a forward-rearward direction and wherein each leg terminates at an intersection of the convex outer edge with one of the facing inner edge sections.

5. An artificial bait structure, comprising:

a head defining a forward end of the artificial bait structure and having a thickness;

a pair of legs extending rearwardly from the heads, wherein the legs are configured such that each leg defines an outer edge located laterally outwardly relative to the head and such that the legs define facing inner edges, wherein the legs have a thickness less than that of the head, and wherein each leg defines a first width adjacent the head and a second width greater than the first width at a location spaced rearwardly therefrom; and wherein each leg defines a rib at its outer edge having a thickness greater than that of the leg inwardly of the rib.

6. The artificial bait structure of claim 5, wherein the leg inner edges define an arcuate opening located toward the head.

7. An artificial bait structure, comprising:

a head having a forward end and a rearward end; and a rear section extending rearwardly from the rearward end of the head, wherein the rear section defines an opening having a closed concave forward end and an open rearward end, wherein the closed forward end of the opening is defined by a concave edge, and wherein the rear section defines a pair of legs located on opposite sides of the opening, wherein each leg defines a forward end and a rearward end spaced rearwardly from the forward end, wherein each leg, throughout at least a portion of its length rearwardly of its forward end, includes a convex outer edge and defines an increasing width in a forward-to-rearward direction such that at least a portion of each leg located toward the leg rearward end has a width greater than a portion of each leg located toward the leg forward end, wherein each leg defines a maximum width location rearwardly of the opening, and wherein the legs are separated from each other by the opening and the open rearward end of the opening, and wherein the concave edge defining the closed forward end of the opening defines inner facing edges of the legs, and wherein the legs define facing inner edge sections which extend in a forward-rearward direction located rearwardly of the opening, and wherein the rearward end of each leg is defined by an intersection of the convex outer edge of the leg with the facing inner edge section of the leg.

8. The artificial bait structure of claim 7, wherein each leg increases in width in a forward-to-rearward direction from a point adjacent the forward end of the leg to a point of maximum width located rearwardly therefrom, and wherein each leg decreases in width from the point of maximum width to the rearward end of the leg.

9. The artificial bait structure of claim 7, wherein each leg defines an inner edge and an outer edge, and wherein each leg inner edge defines an arcuate portion toward the forward end of the leg and a linear portion extending rearwardly from the arcuate portion, wherein the arcuate portion of the legs define an edge of the opening between the legs.

10. The artificial bait structure of claim 7 wherein the head includes a first generally planar upper surface and an opposite, second, generally planar bottom surface.

11. The artificial bait structure of claim 10 wherein each leg has an upper surface lying in a common plane with the upper surface of the head and an opposite, generally planar bottom surface, and wherein the head has a thickness greater than that of the legs such that the bottom surface of the head is located below the bottom surfaces of the legs.

12. The artificial bait structure of claim 7 wherein each leg includes a generally planar upper surface, and an opposite, generally planar bottom surface.

13. The artificial bait structure of claim 12 wherein the bottom surface of each leg defines a shoulder adjacent the rearward end of the head.

14. The artificial bait structure of claim 7, wherein each leg forward portion defines an outwardly curved inner edge, and wherein the outwardly curved inner edges cooperate to define the opening.

15. The artificial bait structure of claim 14, wherein the outwardly curved inner edge of each leg terminates at the location of maximum width.

16. The artificial bait structure of claim 15, wherein each leg rearward portion defines a substantially linear inner edge extending between the location of maximum width and the leg rearward end.

17. The artificial bait structure of claim 14, wherein each leg forward portion defines an outwardly curved outer edge extending rearwardly from the head.

18. The artificial bait structure of claim 17, wherein the outwardly curved outer edge of each leg defines a continuous arcuate outer edge extending from the rearward end of the head to the rearward end of each leg.

19. An artificial bait structure, comprising:

a head having a forward end and a rearward end; and first and second legs extending rearwardly from the rearward end of the head, wherein each leg defines a forward end interconnected with the head and a rearward end spaced rearwardly from the forward end, wherein each leg defines an inner edge and a convex outer edge, and wherein the inner edge of each leg includes a concave arcuate outwardly curved portion toward the forward end of each leg and a rearward section which extends in a forward-rearward direction rearwardly of the concave arcuate portion, wherein the concave arcuate portions of the inner edges of the legs cooperate to define an opening between the legs toward the leg forward ends, and wherein the opening defines a concave forward end and an open rearward end which separates the rearward ends of the legs, and wherein the convex outer edge of each leg defines an arcuate outward curvature extending rearwardly of the head and intersecting the rearward section of the inner edge of the leg to define the rearward end of the leg.

20. The artificial bait structure of claim 19, wherein the outer edge of each leg defines a convex curve extending from the leg rearward end forwardly to a location adjacent the rearward end of the head.

21. An artificial bait structure, comprising:

a head having a forward end and a rearward end; and a rear section extending rearwardly from the rearward end of the head, wherein the rear section defines an opening having a closed concave forward end and an open rearward end, wherein the closed forward end of the opening is defined by a concave edge, and wherein the rear section defines a pair of legs located on opposite sides of the opening, wherein each leg defines a forward end and a rearward end spaced rearwardly from the forward end, wherein each leg, throughout at least a portion of its length rearwardly of its forward end, defines an increasing width in a forward-to-rearward direction such that at least a portion of each leg located toward the leg rearward end has a width greater than a portion of each leg located toward the leg forward end, wherein each leg defines a maximum width location rearwardly of the opening, and wherein the legs are separated from each other by the opening and the open rearward end of the opening, and wherein the concave edge defining the closed forward end of the opening defines inner facing edges of the legs;

wherein each leg includes a generally planar upper surface and an opposite generally planar lower surface, and wherein at least one of the upper and lower surfaces includes a plurality of substantially cylindrical nipples extending therefrom, wherein each nipple extends along a longitudinal axis substantially parallel to the plane of the surface from which the nipple extends, and wherein each nipple terminates in a planar surface substantially perpendicular to the longitudinal axis along which the nipple extends.

22. The artificial bait structure of claim 21 wherein the bottom surface of each leg includes a plurality of nipples projecting downwardly therefrom.

23. The artificial bait structure of claim 22 wherein each nipple projecting from the bottom surface of each leg lies in a row transverse to a longitudinal axis along which the leg extends.

24. The artificial bait structure of claim 21 wherein the upper surface of the head includes a plurality of nipples projecting upwardly therefrom.

25. The artificial bait structure of claim 24 wherein each nipple projecting from the upper surface of the head lies in a row transverse to a longitudinal axis along which the artificial bait structure extends.

26. The artificial bait structure of claim 21 wherein the upper surface of each leg includes a plurality of nipples projecting upwardly therefrom.

27. The artificial bait structure of claim 26 wherein each nipple projecting from the upper surface of each leg lies in a row transverse to a longitudinal axis along which the leg extends.

28. The artificial bait structure of claim 22 wherein the head includes a first generally planar upper surface and an opposite, second, generally planar bottom surface, the upper surface of the head including a plurality of nipples projecting upwardly therefrom, and wherein the upper surface of each leg includes a plurality of nipples projecting upwardly therefrom.

29. An artificial bait structure, comprising:

a head having a forward end and a rearward end;

first and second legs extending rearwardly from the rearward end of the head, wherein each leg defines an inner edge and an outer edge and terminates at a rearward end, and wherein the inner edge of each leg includes a generally linear portion adjacent the rearward end of the leg, wherein the generally linear portions of the legs face each other, and wherein the inner edge of each leg further includes an outwardly curved concave arcuate portion adjacent the rearward end of the head extending toward the outer edge of the leg forwardly of the linear portion, wherein the outwardly curved concave arcuate portions of the leg inner edges cooperate to define a void area having a concave configuration between the legs rearwardly of the head, wherein each leg defines a first width adjacent the head and a second width greater than the first width at a location rearwardly of the void area; and a flexible projection extending rearwardly from the rearward end of each leg in a direction substantially parallel to the generally linear portion of the leg.

* * * * *

UNITED STATES PATENT AND TRADEMARK OFFICE
CERTIFICATE OF CORRECTION

PATENT NO. : 6,237,275 B1
DATED : May 29, 2001
INVENTOR(S) : William E. Chambers, Sr.

It is certified that error appears in the above-identified patent and that said Letters Patent is hereby corrected as shown below:

Column 6,
Line 62, after "direction" insert -- , --;

Column 7,
Line 1, delete "heads" and substitute therefor -- head --.

Signed and Sealed this

Twenty-first Day of January, 2003

JAMES E. ROGAN
*Director of the United States Patent and Trademark Office*

(12) EX PARTE REEXAMINATION CERTIFICATE (8042nd)
United States Patent
Chambers, Sr.

(10) Number: US 6,237,275 C1
(45) Certificate Issued: Feb. 22, 2011

(54) ARTIFICIAL BAIT STRUCTURE

(75) Inventor: Willilam E. Chambers, Sr., Watkinsville, GA (US)

(73) Assignee: Zoom Bait Company, Inc., Bogart, GA (US)

Reexamination Request:
No. 90/009,566, Oct. 16, 2009

Reexamination Certificate for:
Patent No.: 6,237,275
Issued: May 29, 2001
Appl. No.: 08/794,332
Filed: Feb. 3, 1997

Certificate of Correction issued Jan. 21, 2003.

(51) Int. Cl.
*A01K 85/00* (2006.01)

(52) U.S. Cl. ........................... 43/42.29; 43/42.3
(58) Field of Classification Search .......... None
See application file for complete search history.

(56) References Cited
U.S. PATENT DOCUMENTS

D131,135 S   1/1942   Adam
3,389,490 A   6/1968   Peters et al.
4,177,597 A   12/1979  Thomassin
5,524,377 A   6/1996   Freeman et al.

OTHER PUBLICATIONS

Anonymous, Webster's Ninth New Collegiate Dictionary, Merriam–Webster Inc., 1990, p. 538.*
1996 Catalog, Bass Pro Shops, p. 227.
1993 Catalog, Bass Pro Shops Outdoor World, p. 174.

* cited by examiner

*Primary Examiner*—Jeffrey L. Gellner (57) ABSTRACT

An artificial bait structure is provided which simulates movement of live bait when drawn through a body of water, and which discourages entanglement in weeds at the bottom of a lake or river. The artificial bait structure includes a head having first and second legs projecting therefrom. The legs include a plurality of nipples which are engaged by the water as the artificial bait structure is drawn therethrough, causing the legs to flutter. A rib extends along the outer edge of each leg in order to cup the water as the artificial bait structure is drawn therethrough, thereby causing the legs to repeatedly separate and come together.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5, 6, 21-28 is confirmed.

Claims 2-4, 7-10, 12-20 and 29 are cancelled.

Claims 1 and 11 are determined to be patentable as amended.

1. An artificial bait structure, comprising:
    a head having a forward end and a rearward end; and
    first and second legs extending rearwardly from the rearward end of the head, wherein each leg defines an inner edge and an outer edge and terminates at a rearward end, wherein each leg includes a rib *located at and* extending along the outer edge of the leg between the head and the rearward end of the leg, wherein the rib has a thickness greater than that of the *entirety of the* leg [inwardly of] *located between* the rib *and the inner edge of the leg*.
11. [The artificial bait structure of claim 10] *An artificial bait structure, comprising:*
    *a head having a forward end and a rearward end; and*
    *a rear section extending rearwardly from the rearward end of the head, wherein the rear section defines an opening having a closed concave forward end and an open rearward end, wherein the closed forward end of the opening is defined by a concave edge, and wherein the rear section defines a pair of legs located on opposite sides of the opening, wherein each leg defines a forward end and a rearward end spaced rearwardly from the forward end, wherein each leg, throughout at least a portion of its length rearwardly of its forward end, includes a convex outer edge and defines an increasing width in a forward-to-rearward direction such that at least a portion of each leg located toward the leg rearward end has a width greater than a portion of each leg located toward the leg forward end, wherein each leg defines a maximum width location rearwardly of the opening, and wherein the legs are separated from each other by the opening and the open rearward end of the opening, and wherein the concave edge defining the closed forward end of the opening defines inner facing edges of the legs, and wherein the legs define facing inner edge sections which extend in a forward-rearward direction located rearwardly of the opening, and wherein the rearward end of each leg is defined by an intersection of the convex outer edge of the leg with the facing inner edge section of the leg;*
    *wherein the head includes a first generally planar upper surface and an opposite, second, generally planar bottom surface; and*
    wherein each leg has an upper surface lying in a common plane with the upper surface of the head and an opposite, generally planar bottom surface, and wherein the head has a thickness greater than that of the legs such that the bottom surface of the head is located below the bottom surfaces of the legs.

* * * * *